US009558112B1

(12) United States Patent
Borchers

(10) Patent No.: US 9,558,112 B1
(45) Date of Patent: Jan. 31, 2017

(54) DATA MANAGEMENT IN A DATA STORAGE DEVICE

(75) Inventor: Albert T. Borchers, Aptos, CA (US)

(73) Assignee: Google Inc., Mountain View, CA (US)

( * ) Notice: Subject to any disclaimer, the term of this patent is extended or adjusted under 35 U.S.C. 154(b) by 82 days.

(21) Appl. No.: 13/466,570

(22) Filed: May 8, 2012

(51) Int. Cl.
*G06F 12/02* (2006.01)

(52) U.S. Cl.
CPC ....... *G06F 12/0253* (2013.01); *G06F 12/0246* (2013.01); *G06F 2212/2022* (2013.01)

(58) Field of Classification Search
CPC G06F 12/0246; G06F 12/0804; G06F 3/0688; G06F 12/0253; G06F 2212/7208; G06F 2212/7205; G06F 11/008; G06F 2212/222; G06F 2212/2022
USPC .................................. 711/102, 142
See application file for complete search history.

(56) References Cited

U.S. PATENT DOCUMENTS

| 6,339,779 | B1 * | 1/2002 | Houldsworth |
| 6,738,875 | B1 * | 5/2004 | Wang ............................ 711/159 |
| 2005/0278487 | A1 * | 12/2005 | Blandy ......................... 711/145 |
| 2007/0011660 | A1 * | 1/2007 | Garyali et al. ................ 717/127 |
| 2007/0033362 | A1 * | 2/2007 | Sinclair ......................... 711/165 |
| 2008/0059747 | A1 | 3/2008 | Burckart et al. |
| 2008/0294814 | A1 | 11/2008 | Gorobets |
| 2009/0089500 | A1 * | 4/2009 | Jiang ............................. 711/113 |
| 2009/0157950 | A1 | 6/2009 | Selinger |
| 2010/0070698 | A1 * | 3/2010 | Ungureanu ....... G06F 17/30067 711/108 |
| 2010/0262766 | A1 | 10/2010 | Sprinkle et al. |
| 2010/0287217 | A1 * | 11/2010 | Borchers et al. ............. 707/813 |
| 2010/0325351 | A1 | 12/2010 | Bennett |
| 2011/0258368 | A1 * | 10/2011 | Kim .............................. 711/103 |
| 2011/0258391 | A1 * | 10/2011 | Atkisson et al. ............ 711/118 |
| 2012/0059978 | A1 * | 3/2012 | Rosenband et al. ......... 711/103 |
| 2012/0096217 | A1 * | 4/2012 | Son ..................... G06F 12/0246 711/103 |
| 2013/0254498 | A1 * | 9/2013 | Adachi ................. G06F 9/3004 711/155 |

FOREIGN PATENT DOCUMENTS

EP          784325    A1 *   7/1997    ............. G11C 16/06

OTHER PUBLICATIONS

Shu, Frank and Obr, Nathan, Data Set Management Commands Proposal for ATA8-ACS2, Jul. 26, 2007, Microsoft Corporation, p. 7.*
Micron, TN-2960: Garbage Collection in SLC NAND Flash Memory Introduction, 2011.*

* cited by examiner

*Primary Examiner* — Adam M Queler
*Assistant Examiner* — Alex Olson
(74) *Attorney, Agent, or Firm* — Brake Hughes Bellermann LLP

(57) ABSTRACT

A data storage device includes multiple flash memory devices with each of the flash memory devices being arranged into multiple blocks having multiple pages for storing data. The data storage device includes a memory controller operationally coupled with the flash memory devices. The memory controller is configured to mark one or more of the pages of the flash memory devices as available for deletion and maintain the marked pages as available for being read until deleted during garbage collection.

15 Claims, 4 Drawing Sheets

DATA MANAGEMENT IN A DATA STORAGE DEVICE

TECHNICAL FIELD

This description relates to data management in a data storage device.

BACKGROUND

Data storage devices may be used to store data. A data storage device may be used with a computing device to provide for the data storage needs of the computing device. In certain instances, it may be desirable to store large amounts of data on a data storage device. Also, it may be desirable to execute commands quickly to read data and to write data to the data storage device.

SUMMARY

According to one general aspect, a data storage device includes multiple flash memory devices with each of the flash memory devices being arranged into multiple blocks having multiple pages for storing data. The data storage device includes a memory controller operationally coupled with the flash memory devices. The memory controller is configured to mark one or more of the pages of the flash memory devices as available for deletion and maintain the marked pages as available for being read until deleted during garbage collection.

Implementations may include one or more of the following features. For example, the memory controller may be further configured to unmark the marked pages such that the pages are garbage collected during garbage collection. The memory controller may be further configured to mark one or more of the pages for immediate deletion. The memory controller may be further configured to use a bitmap to track the marked pages. The memory controller may further configured to garbage collect the pages of the flash memory devices and to delete the marked pages during garbage collection using the bitmap. The memory controller may be configured to receive a command from a host computing device that indicates which of the pages to mark. At least some of the pages may be used as a cache.

In another general aspect, a method includes marking, by a memory controller of a data storage device having multiple flash memory devices, one or more pages of the flash memory devices as available for deletion and maintaining the marked pages as available for being read until deleted during garbage collection.

Implementations may include one or more of the following features. For example, the method may include unmarking, by the memory controller, the marked pages such that the pages are garbage collected during garbage collection. The method may include marking, by the memory controller, one or more of the pages for immediate deletion. The method may include tracking the marked pages using a bitmap. The method may include garbage collecting the pages of the flash memory devices and deleting the marked pages during garbage collection using the bitmap. The method may include receiving, by the memory controller, a command from a host computing device that indicates which of the pages to mark.

In another general aspect, a system includes a host device having one or more applications and a data storage device operationally coupled with the host device. The data storage device includes multiple flash memory devices with each of the flash memory devices being arranged into multiple blocks having multiple pages for storing data. The data storage device includes a memory controller operationally coupled with the flash memory devices. The memory controller is configured to mark one or more of the pages of the flash memory devices as available for deletion and maintain the marked pages as available for being read until deleted during garbage collection.

Implementations may include one or more of the following features. For example, the memory controller may be configured to unmark the marked pages such that the pages are garbage collected during garbage collection. The memory controller may be configured to mark one or more of the pages for immediate deletion. The memory controller may be configured to use a bitmap to track the marked pages. The memory controller may be configured to garbage collect the pages of the flash memory devices and to delete the marked pages during garbage collection using the bitmap. The host device may be configured to communicate a command to the data storage device that indicates which of the pages to mark. The system may include a second data storage device operationally coupled to the host device and to the data storage device. The second data storage device may include a disc for storing data, where the data storage device having the flash memory devices may be used as a cache for the data on the second data storage device.

The details of one or more implementations are set forth in the accompanying drawings and the description below. Other features will be apparent from the description and drawings, and from the claims.

DETAILED DESCRIPTION

Figure 1:
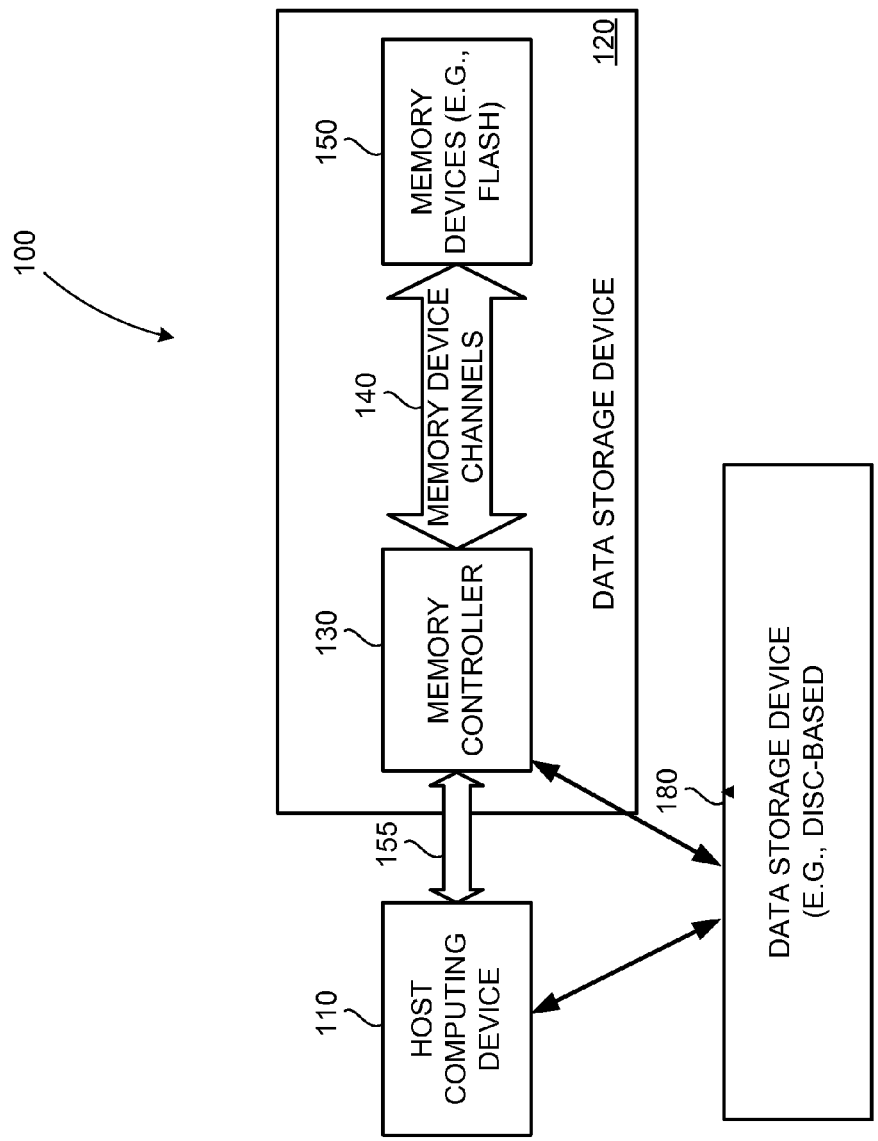
FIG. 1 is a block diagram illustrating a computing system in accordance with an example implementation.

This document describes systems and techniques to manage data on a data storage device in conjunction with a host computing device. The data storage device may include multiple memory devices. The multiple memory devices may be any type of memory device, as discussed in more detail below, including multiple flash memory devices. The host computing device may include one or more applications that send memory operation commands for execution by the multiple memory devices.

In one exemplary implementation, the data storage device having the multiple flash memory devices may be used as a cache between the host computing device and another data storage device such as, for example a disc-based data storage device. In this manner, data from the disc-based data storage device also may be stored on the flash-based data storage device to enable faster read access to the data.

Write memory operations commands may be used to write the data to the flash-based data storage device. A garbage collection process is used to free memory space on the flash-based data storage device so that data can be written to the flash memory devices. While the data stored in the data storage device being used as a cache may be considered expendable, since it is a copy of the data being stored on the disc-based data storage device, it may be desirable to be able to designate the cache data in a way that keeps the data on the flash memory devices until such time that the data storage device decides that the data should be garbage collected and the data is deleted from the flash memory devices. In this manner, the data may remain on the flash memory devices and is still available to be read until the data is garbage collected, at which time the data is discarded from the flash memory devices and is no longer available to be read.

In one exemplary implementation, the host computing device may use a command, which also may be referred to interchangeably throughout this document as a cache trim command, a cache discard command or a cache trim/discard command, to mark data on the data storage device having the flash memory devices as expendable such that the marked data is kept until the data storage device determines that the marked data needs to be garbage collected to free space on the memory devices for other data. The host computing device also may use another command, such as a trim command (also referred to as a discard command or a trim/discard command) to mark data on the data storage device for immediate deletion. The host computing device also may use another command to mark data on the data storage device for retention so that it does not get deleted until the host computing device marks it otherwise. Data that is not otherwise marked may be garbage collected as part of the normal garbage collection process.

Applications on the host computing device that use the data storage device as a cache may use a cache trim/discard command to mark all cache pages or to mark cache pages that the applications determine are less likely to be read from the cache. The data will remain available until the data storage device needs to garbage collect it, and at that time it will be deleted from the data storage device.

In one exemplary implementation, the data storage device may unmark the data that the had been marked using the cache trim/discard command. A command that unmarks the data in this manner may be referred to as a cache untrim, cache undiscard or cache untrim/undiscard command. When this command is invoked, the data may revert back to the normal state that will be garbage collected as part of the regular garbage collection process. Applications on the host computing device may use a combination of the cache trim/discard commands and the cache untrim/undiscard commands to manage the hot (i.e., more frequently requested) pages and the cold (i.e., less frequently requested) pages of the data storage device by changing the state of data in the data storage device based on the use of the cache.

In one exemplary implementation, the data storage device may track the data that has been marked by a cache trim/discard command using a bitmap. For example, the data storage device and/or the host computing device may use one bitmap to track active pages of data in the data storage device and a second bitmap to track the pages of data that have been marked for cache trim/discard. A garbage collection process would check both bitmaps to decide which pages of data to garbage collect. Only active pages that have not been marked in the second bitmap would be garbage collected. Inactive pages of data may be skipped over. Active pages of data that have been marked in the second bitmap would not be garbage collected, but a logical address to physical address map would be updated to indicate the logical page is now unallocated. When a page of data that has been marked for cache trim/discard is overwritten, the active bit for the old page of data may be cleared.

In one exemplary implementation, a garbage collection control engine, the first bitmap and the second bitmap may be implemented on the host device. In other exemplary implementations, the garbage collection control engine, the first bitmap and the second bitmap may be implemented in a memory controller on the data storage device.

FIG. 1 is a block diagram illustrating a computing system 100 in accordance with an example implementation. The computing system 100 includes a host computing device 110 and a data storage device 120. The host computing device 110 and the data storage device 120 may be implemented using the techniques described herein. The host 110, in this example may be an electronic device that is operably coupled with the data storage device 120, and may issue various types of commands and/or requests to the data storage device. The host 110 may take a number of forms. As some examples, the host 110 may be implemented as a personal computer, a laptop computer, a server, a tablet computer or a netbook computer. In other implementations, the host 110 may take other forms as well. The data storage device 120 also may take a number of forms. The data storage device 120 may be implemented as a number of appropriate devices that may work in conjunction with a host device (e.g., the host device 110) to store and/or retrieve electronic data. For instance, the data storage device may be a solid state drive (SSD) (e.g., a flash memory based SSD), a magnetic disk drive or an optical disk drive, as some examples.

As shown in FIG. 1, the data storage device 120 includes a memory controller 130, memory device channel interfaces 140 (also referred to as memory device channels) and memory devices 150. The memory devices 150 may be implemented using a number of different types of memory devices. For instance, the memory devices 150 may be implemented using flash memory devices (e.g., NAND flash memory devices), or other types of non-volatile memory devices. In certain implementations, volatile memory devices, such as random access memory devices, may be used. For purposes of this disclosure, the various implementations described herein will be principally discussed as being implemented using flash memory devices. It will be appreciated, however, that other approaches are possible and other types of memory devices may be used to implement the implementations described herein.

In the computing system 100, as well as in other implementations described herein, the memory controller 130 may obtain memory operation commands from the host computing device 110. When implementing the data storage device 120 using flash memory devices for the memory devices 150, the memory operation commands obtained by the memory controller 130 from the host computing device 110 may include flash memory read commands, flash memory write commands and flash memory erase commands, as well as other types of flash memory commands (e.g., move commands and/or copy commands). For purposes of this disclosure, the terms memory operation command, memory operation and memory command may be used interchangeably to describe machine-readable instructions (e.g., from a host computing device to a data storage device) to execute one or more data storage functions in a data storage device.

In the computing system 100, the memory devices 150 may include a plurality of memory devices, such as flash memory devices, that are organized into a plurality of memory channels. In such an approach, each of the memory channels may include one or more individual memory devices. Depending on the particular implementation, the individual memory devices of a given memory channel may be implemented in individual device packages, or alternatively, multiple memory devices of a given memory channel may be included in a single device package.

For instance, in an example implementation, the data storage device 120 may include multiple memory channels, where each memory channel includes multiple flash memory devices 150 that are implemented in multiple separate device packages (e.g., four flash memory devices per package). In such an approach, the memory controller 130 may communicate with the memory devices 150 of each memory channel using a separate memory device channel interface 140. Each memory device channel interface 140 may include a respective channel controller that is configured to facilitate communication between the memory devices 150 of the respective memory channel and the memory controller 130. For example, such channel controllers may be configured to manage a shared bus between the memory controller 130 and the memory devices 150 of a given memory channel, including communicating memory operation commands, chip select information, as well as managing communication of other data and control information between the memory controller 130 and the memory devices 150 over a corresponding memory device channel interface 140.

In one exemplary implementation, the memory controller 130 and other components may be disposed on a printed circuit board and the memory devices 150 may be disposed on one or more other printed circuit boards. The printed circuit boards may be assembled together.

In one exemplary implementation, a high speed link 155 may be used to connect the host computing device 110 and the data storage device 120. The link 155 may be a physical connector or it may be a logical connector. For instance, the link 155 may be a PCI-e link to connect and route signals between the host computing device 110 and the data storage device 120.

In one exemplary implementation, the computing system 100 may include a second data storage device 180. The data storage device 180 may be operationally coupled to both the host computing device 110 and the data storage device 120 through the memory controller 130. The data storage device 180 may be a disc-based data storage device. The data storage device 180 also may include other types of data storage. A link similar to link 155 may operationally couple the data storage device 180 to the host computing device 110 and the data storage device 120.

In one implementation, the data storage device 120 may be used as a cache between the host computing device 110 and the data storage device 180. In this manner, data stored on the data storage device 120 using flash memory devices 150 may be accessed faster than the same data stored on the data storage device 180 using a disc to store the data, thus providing a faster response to read memory operation commands.

Figure 2:
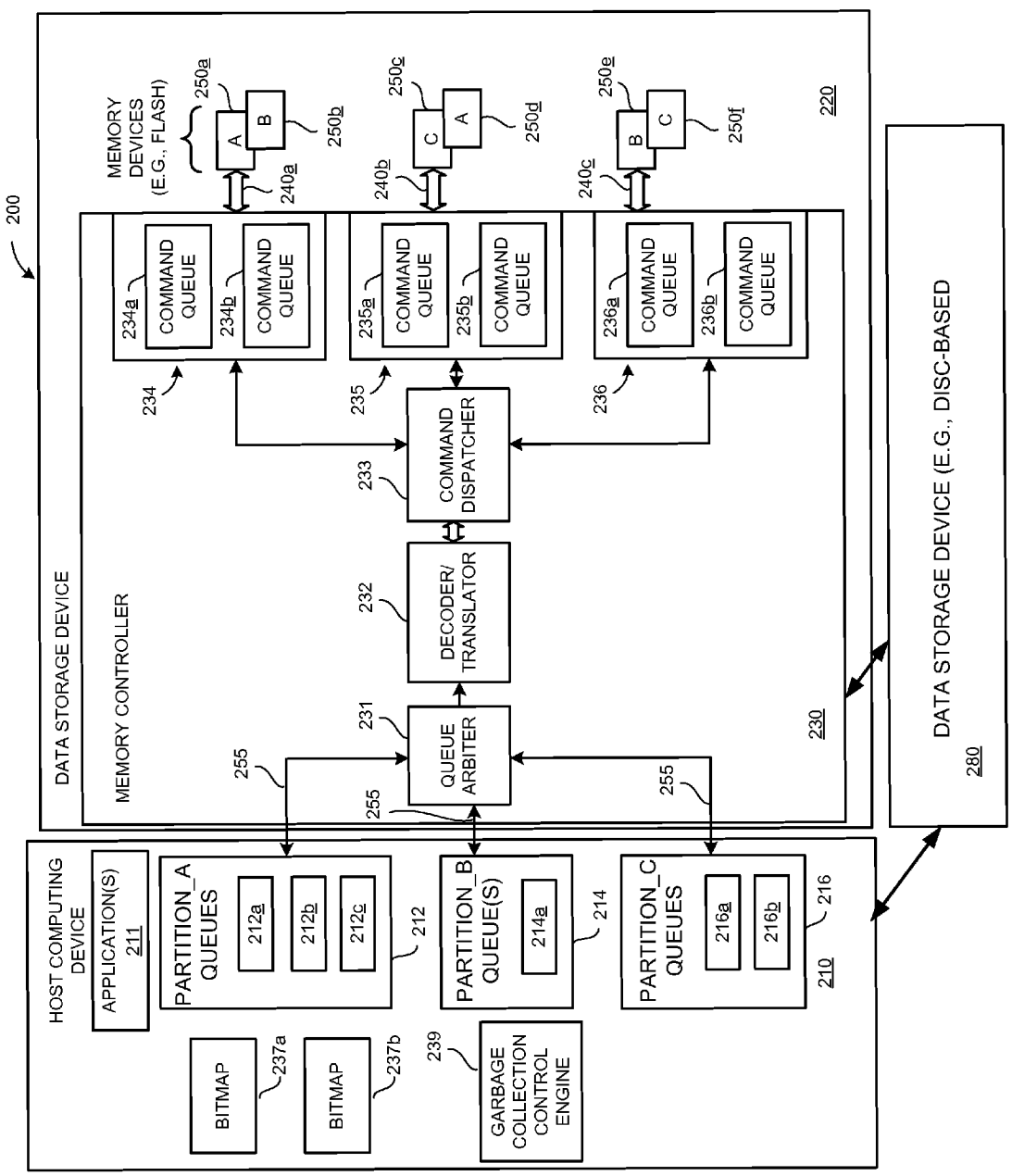
FIG. 2 is a block diagram illustrating another computing system in accordance with an example implementation.

FIG. 2 is a block diagram illustrating a computing system 200 in accordance with another example implementation. The computing system 200 shown in FIG. 2 includes similar elements to the computing system 100 shown in FIG. 1. Like elements of the computing system 200 to those of the computing system 100 are referenced with 200 series reference numerals that correspond with the 100 series reference numerals shown in FIG. 1. For instance, the computing system 200 includes a host computing device 210 and a data storage device 220. Optionally, the computing system 200 may include a second data storage device 280, which may be a disc-based data storage device.

The data storage device 220 includes a memory controller 230, memory device communication channels 240 (240a-240c), memory devices 250 (250a-250f). A link 255 connects and routes signals between the host computing device 210 and the data storage device 220. The link 255 may be a physical connector or a logical connector. A similar link may operationally couple the data storage device 280 to the host computing device 210 and the data storage device 220.

The various elements of the computing system 200 shown in FIG. 2 (as well as the other implementations described herein) are provided by way of illustration. The computing system 200 (and the other implementations described herein) may include other elements or aspects. For instance, the computing system 200, may include data path elements configured to communicate data between the host device 210 and the memory controller 230 and/or the memory devices 250a-250f. Such data path components may include, for example, one or more bus interfaces and/or a direct memory access (DMA) controller, as well as a number of other possible components. Further, the computing system 200 may also include additional control path elements other than those shown in FIG. 2. It will be appreciated that the particular components and/or aspects of the computing system 200, as well as the other implementations described herein, will depend, at least in part, on the particular implementation.

In the computing system 200, the host computing device 210, the memory controller 230, the memory device channels 240 and the memory devices 250 may be configured to implement a plurality of memory partitions. In the implementation shown in FIG. 2, three memory partitions are implemented, PARTITION_A, PARTITION_B and PARTITION_C. In other implementations, additional or fewer partitions may be implemented.

As shown in FIG. 2 the host computing device 210 includes one or more queues (which may be referred to as host memory operation queues or partition queues or partitions) that are associated with each memory partition implemented in the computing system 200. For example, the host computing device 210 includes PARTITION_A Queues 212, PARTITION_B Queues 214 and PARTITION_C Queues 216. In the host computing device 210, the PARTITION_A Queues 212 includes a queue 212a, a queue 212b and a queue 212c; the PARTITION_B Queues 214 includes only a single queue 214a; and the PARTITION_C Queues 216 includes a queue 216a and a queue 216b. In other implementations, additional or fewer queues may be used for each memory partition. In the computing system 200, the memory partition queues 212-216 may be used to queue memory operation commands generated by the host computing device 210 that are waiting to be communicated to the memory controller 230 for execution by the memory devices 250.

In the computing system 200, the host computing device 210 may be configured to assign priorities to the individual host memory operation queues for memory partitions that have more than one queue associated with them. The host computing device 210 may include one or more applications 211 that assign the priorities and that perform other functions related to accessing and providing requests for memory command operations on the data storage device 220.

For instance, for the PARTITION_A Queues 212, the queue 212a may be a high priority queue, the queue 212b may be a medium priority queue and the queue 212c may be a low priority queue. In order to implement such priorities, the host computing device 210 may assign weights to the individual queues. The PARTITION_A Queues 212 may then be sampled (by the memory controller 230 to obtain memory operations) in accordance with a work schedule that is based on the respective weights assigned to each queue. For example, if the queue 212a is assigned a weight of "6", the queue 212b is assigned a weight of '3' and the queue 212c is assigned a weight of '1', the corresponding work schedule would result in memory commands for PARTITION_A being obtained (by the memory controller 230) from the queue 212a twice as frequently as from the queue 212b and six times as frequently as from the queue 212c. Similarly, memory commands would be obtained (by the memory controller 230) from the queue 212b three times as frequently as from the queue 212c.

In addition to the relative priorities between individual host memory operation queues that are associated with a given memory partition, the memory controller 230 may sample the separate partition queue groups 212-216 based on a memory partition work-schedule, where the memory partition work schedule is based on relative priorities of the memory partitions with respect to one another. For example, the relative priorities between partitions may be determined based on command buffer slot allocations for each partition in the memory controller 230. Briefly, in such an approach, the groups of partition queues may be sampled based on a first set of relative priorities between the memory partitions (e.g., based on a memory partition work schedule), while the individual queues within a given group of partition queues may be sampled based on a second set of relative priorities between the individual queues (e.g., based on a partition queue work schedule). It will be appreciated that the memory partition work schedule and the queue partition work scheduled may be implemented using a number of appropriate techniques, such as round robin, weighted round robin or other work scheduling techniques. Using such an approach, performance for each memory partition may be isolated from the other partitions, where guaranteed resources (e.g., memory command slots) may be allocated to each memory partition.

In one exemplary implementation, the individual queues within a particular memory partition may be used for different types of memory operation commands. For example, one individual queue within a memory partition may be used for read memory operation commands and another individual queue within the same memory partition may be used for write memory operation commands. For example, PARTITION_C 216 includes two individual queues, 216a and 216b. Queue 216a may be used for read memory operation commands and queue 216b may be used for write memory operation commands.

For partitions having a plurality of individual queues within the same memory partition, those individual queues may be used for other types of commands in addition to read memory operation commands and write memory operation commands.

As shown in FIG. 2, the memory controller 230 of the computing system 200 includes a queue arbiter 231, a decoder/translator 232, a command dispatcher 233, command queue groups 234, 235 and 236, memory device channel interfaces 240a-240c and flash memory devices 250a-250f. As shown in FIG. 2, each memory device 250a-250f is associated with one of the three memory partitions of the computing system 200 (A, B or C, as indicated in FIG. 2). The particular arrangement shown in FIG. 2 is given by way of example and other arrangements are possible. For instance, the distribution of the memory devices across the memory partitions may be weighted. For example, four of the memory devices 250a-250f could be assigned to PARTITION_A, while only a single one of the memory devices 250a-250f may be respectively assigned to each of PARTITION_B and PARTITION_C. Of course, the computing system 200 may include additional or fewer memory devices and may also implement additional or fewer memory partitions, where the memory partitions may then be implemented in a number of different arrangements, such as using the techniques described herein.

As indicated above, in the computing system 200, the queue arbiter 231 of the memory controller 220 may be configured to obtain, from the host device 210, memory operation commands for execution by the memory devices in a number of fashions. For example, in one implementation, the queue arbiter 231 may be configured to obtain the memory operation commands from the host device in accordance with a partition work schedule for a plurality of memory partitions implemented in the data storage device, such as using the techniques described herein. In one implementation, such a partition work schedule may be based on availability of allocated memory operation command slots for each respective memory partition.

In the computing system 200, the queue arbiter 231 may be further configured, for a given memory partition, to obtain memory operation commands for the given memory partition (e.g., A, B or C) from one or more partition queues on the host device 210 that correspond with the given memory partition (respectively 212, 214 and 216) in accordance with such a partition work schedule. Further, the queue arbiter 231 may be still further configured to obtain memory operation commands for memory partitions having a plurality of corresponding partition queues in the host device 230 in accordance with respective priorities for each queue of the respective plurality of partition queues (e.g., in accordance with a partition queue work schedule).

In the computing system 200, the decoder/translator 232 may be configured to respectively determine which of the plurality of memory devices 250 corresponds with each of the memory operation commands. For instance, the decoder/translator 232 may be configured to perform logical to physical address translation on a respective memory address included in each of the memory operation commands that are obtained from the host computing device 210. Once the physical memory address is determined, the corresponding memory device 250 can be determined from the physical address.

In other implementations, address translation may be performed by the host device 210. In such an approach, the decoder/translator 232 could be eliminated, and the queue arbiter 231 may be directly coupled with the command dispatcher 233. In other implementations, the decoder/translator 232 may perform additional functions, such as decoding received memory commands into respective sub-commands. It will be appreciated that the memory partition associated with each memory command is known when the command is obtained from the host computing device 210, as the host memory operation queues 212-214 are organized by partition.

The command dispatcher 233 of the computing system 200 may be operationally coupled with the queue arbiter 231 (e.g., via the decoder/translator 232 or directly), where the command dispatcher 233 is configured to receive the memory operation commands from the queue arbiter 231 (or sets of sub-commands for those memory operations commands) in a same order as obtained by the queue arbiter 231 from the host device 210. The command dispatcher 233 may be further configured to separately and respectively queue the memory operation commands for each of a plurality of memory devices 250.

In the computing system 200, the command dispatcher 233 may be further configured to dispatch the memory commands to their respective command queues 234-236, such as based on a physical memory address determined by the decoder/translator 232. In the computing system 200, the command dispatcher 233 may be configured to dispatch respective memory operations for a given memory device 250 based on availability of queue slots in a respective command queue of the command queues 234-236.

The memory controller 230 of the computing system 200 shown in FIG. 2 includes groups of command queues 234, 235 and 236 (or memory device command queues) that are operationally coupled with the command dispatcher 233. In the computing system 200, each command queue group 234, 235 and 236 corresponds with a respective memory channel, such as described herein. Further, each command queue group 234, 235 and 236 includes individual command queues that each respectively correspond with a memory device of their respective memory channel. As an example, the command queue group 234 (which includes a command queue 234a and a command queue 234b) is operationally coupled with the memory device channel interface 240a. The memory device channel interface 240a is, in turn, operationally coupled with the memory devices 250a and 250b. The command queues 234a and 234b are associated, respectively, with the memory devices 250a and 250b. In such an arrangement, the memory device 250a would receive memory operation commands from the command queue 234a, while the memory device 250b would receive memory operation commands from the command queue 234b. The command queue groups 235 and 236 (and their command queues 235a, 235b, 236a and 236b) correspond with memory device channel interfaces 240b and 240c, and memory devices 250c, 250d, 250e and 250f in similar fashion as discussed above for the command queue group 234, the memory device channel interface 240a, and the memory devices 250a and 250b.

In the computing system 200, each of the command queues 234a-236b may be configured to receive the dispatched memory operation commands corresponding with its respective memory device 250a-250f from the command dispatcher 233 in a same order as received by the command dispatcher 233 from the queue arbiter. The commands queues 234a-236b may each be further configured to provide the received memory operation commands to their respective memory devices 250a-250f in a first-in-first-out order. Also, in the computing system 200, in implementations where each of the memory devices 250a-250f is associated with a respective memory partition, the command queues 234a-236b would likewise be associated with the same memory partition as their corresponding memory device.

The host device 210 may include a garbage collection control engine 239. While illustrated and described as being implemented on the host device 210, in other exemplary implementations, the garbage collection control engine 239 may be implemented as part of the memory controller 230.

The garbage collection control engine 239 can be used to coordinate and control garbage collection operations on the data storage device 220. Cells of memory devices 250 are organized in block units and each block includes a plurality of pages. Data can be written to and read from a memory device 250 in page-sized units, but when data is erased from a memory device 250, it is to be erased in block-sized units.

In addition, memory devices 250 cannot be updated in-place, that is, data written to a page of a chip cannot be overwritten by new data. Instead, the new data must be written to a different location, and the old data must be declared invalid. Because of these constraints, when updating of data on the data storage device an out-of-place updating scheme must be used in which the new data are written to a different physical location than the old data, and then the old data are declared invalid.

Figure 3:
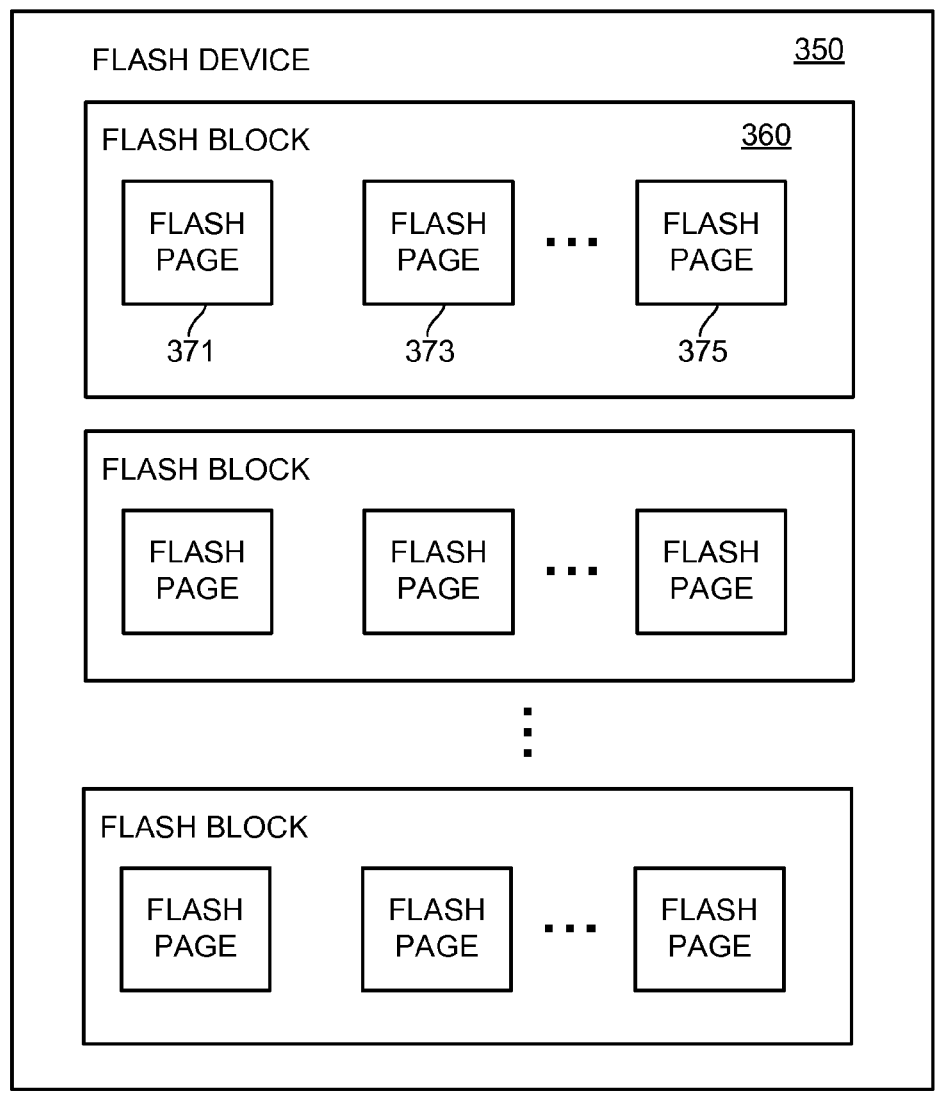
FIG. 3 is a block diagram illustrating a flash memory device that may be used in the computing systems of FIGS. 1 and 2 in accordance with example implementations.

Referring also to FIG. 3, a block diagram illustrates a flash memory device 350 that may be used in the computing systems of FIGS. 1 and 2 in accordance with example implementations. For instance, the flash memory device 350 may be used to implement the memory devices 150 of the computing system 100 shown in FIG. 1 and/or the flash memory devices 250 of the computing system 200 shown in FIG. 2. As illustrated in FIG. 3, the flash memory device 350 includes a plurality of flash memory blocks, such as the flash memory block 360. While only three flash memory blocks are shown in the flash memory device 350, as is indicated in FIG. 3, the flash memory device 350 may include additional flash memory blocks. As is also shown in FIG. 3, each flash memory block of the flash memory device 350 may include a plurality of flash memory pages, such as the flash memory pages 371, 373 and 375. As with the flash memory blocks of the flash memory device 350, while only three flash memory pages are shown for each flash memory block of the flash memory device 350, as indicated in FIG. 3, each flash memory block may include additional flash memory pages.

Referring back to FIG. 2, thus, pages of memory devices 250 can have one of three states: (1) free (wherein the page contains no data and is available to store new or updated data); (2) valid (wherein the page contains new or recently updated data that is available to be read); or (3) invalid (wherein the page contains obsolete data or data marked for deletion). As one can imagine, after some cycles of updating data on a memory device 250 using the out-of-place updating procedure, many blocks will have both valid and invalid pages, which reduces the number of free pages available to receive new or updated data.

Therefore, a garbage collection process is used to reclaim free pages on a memory device. In a garbage collection process, a block is targeted for having all of its data erased, so that the pages of the block can be reclaimed as free pages. Before erasing the pages of the block, the valid pages of the block are copied to a new location into free pages of one or more different blocks or one or more different memory devices 250. After all the valid pages of the targeted block are successfully copied to the new locations, the pages of the targeted block are erased, so that they are free to have data written to them.

Garbage collection is important for using a flash memory device, but garbage collection is also time-consuming. This is because in a flash memory storage device, write operations to a flash memory chip take much longer (e.g., approximately 10 times longer) than read operations from a flash memory chip, and because erase operations take much longer (e.g., approximately 10 times longer) than write operations. Thus, the interleaving garbage collection operations with the read operations associated with reading a file from the data storage device 220 to the host computing device 210 can significantly delay the reading of the data file from the data storage device to the host computing device.

Garbage collection can be performed when it is necessary to reclaim free space on a memory chip in order to write new or updated data to the chip. For example, if the chip contains fewer free pages than are necessary to receive the data that is intended to be written to the chip, then garbage collection must be performed to erase enough blocks to reclaim a sufficient number of pages to receive the data to be written to the chip.

As discussed above, in one exemplary implementation, the data storage device 220 may be used as a cache for data between the host computing device 210 and the data storage device 280. While the data stored in the data storage device 220 being used as a cache may be considered expendable, since it is a copy of the data being stored on the data storage device 280, it may be desirable to be able to designate the cache data in a way that keeps the data on the flash memory devices 250 until such time that the data storage device 220 decides that the data should be garbage collected and the data is deleted from the flash memory devices 250. In this manner, the data may remain on the flash memory devices 250 and is still available to be read until the data is garbage collected by the garbage collection control engine 239, at which time the data is discarded from the flash memory devices 250 and is no longer available to be read.

The memory controller 230 may be configured to mark one or more of the pages (e.g., flash pages 371, 373, 375 and similar pages of FIG. 3) of the flash memory devices 250 as available for deletion. The memory controller 230 would maintain the marked pages as available for being read until deleted during garbage collection. In this manner, the marked pages would not be garbage collected (i.e., meaning copied and written to other pages in the flash memory devices 250) but rather would be deleted when the flash blocks containing those pages are garbage collected. Since the data storage device is being used as a cache, it isn't necessary to keep all of the data in the flash memory devices 250. However, by marking certain pages as available for deletion, even though the data is still valid, and keeping them as available for being read until deleted during garbage collection, this may make good use of the cache and improve garbage collection efficiency. The decision regarding which pages are available for being read may be made by either the host computing device 210 or the memory controller 230.

In one exemplary implementation, the host computing device 210 may use a command, which also may be referred to interchangeably throughout this document as a cache trim command, a cache discard command or a cache trim/discard command, to cause the memory controller 230 to mark data on the data storage device 220 having the flash memory devices 250 as expendable such that the marked data is kept until the data storage device 220 determines that the marked data needs to be garbage collected to free space on the memory devices 250 for other data. The host computing device 220 also may use another command, such as a trim command (also referred to as a discard command or a trim/discard command) to cause the memory controller 230 to mark data on the data storage device 220 for immediate deletion. The host computing device 210 also may use another command to cause the memory controller 230 mark data on the data storage device 220 for retention so that it does not get deleted until the host computing device 210 indicates otherwise. Data that is not otherwise marked may be garbage collected as part of the normal garbage collection process.

Applications 211 on the host computing device 210, when the data storage device 220 is being used as a cache, may use a cache trim/discard command to mark all cache pages or to mark cache pages that the applications 211 determine are less likely to be read from the cache. The data will remain available until the data storage device 220 needs to garbage collect it, and at that time it will be deleted from the memory device 250 on the data storage device 220.

The memory controller 230, in conjunction with or at the direction of the garbage collection control engine 239, may determine when to perform garbage collection. In this manner, the management of the data storage device 220 and the performance and efficiency of the data storage device 220 may be divided between host computing device 210, which determines the pages to mark with the cache trim command, and the data storage device 220, which performs the garbage collection.

In one exemplary implementation, the data storage device 220, using its memory controller 230, may unmark the data that the had been marked using the cache trim/discard command. A command that unmarks the data in this manner may be referred to as a cache untrim, cache undiscard or cache untrim/undiscard command. When this command is invoked, the data may revert back to the normal state that will be garbage collected as part of the regular garbage collection process.

In one exemplary implementation, applications 211 on the host computing device 210 may use a combination of the cache trim/discard commands and the cache untrim/undiscard commands to manage the hot (i.e., more frequently requested) pages and the cold (i.e., less frequently requested) pages of the data storage device 220 by changing the state of data in the data storage device 220 based on the use of the cache.

In one exemplary implementation, the data storage device may track the data that has been marked by a cache trim/discard command using one or more bitmaps 237a and 237b. For example, the data storage device 220 may use one bitmap 237a to track active pages of data in the data storage device 220 and a second bitmap 237b to track the pages of data that have been marked for cache trim/discard. The bitmaps 237a and 237b may be implemented on the host device 210. In other exemplary implementations, the bitmaps 237a and 237b may be implemented as part of the memory controller 230 on the data storage device 220.

A garbage collection process, using the garbage collection control engine 239, would check both bitmaps 237a and 237b to decide which pages of data to garbage collect. Only active pages that have not been marked in the second bitmap 237b would be garbage collected. Inactive pages of data may be skipped over. Active pages of data that have been marked in the second bitmap 237b would not be garbage collected, but a logical address to physical address map would be updated to indicate the logical page is now unallocated. When a page of data that has been marked for cache trim/discard is overwritten, the active bit for the old page of data may be cleared.

Figure 4:
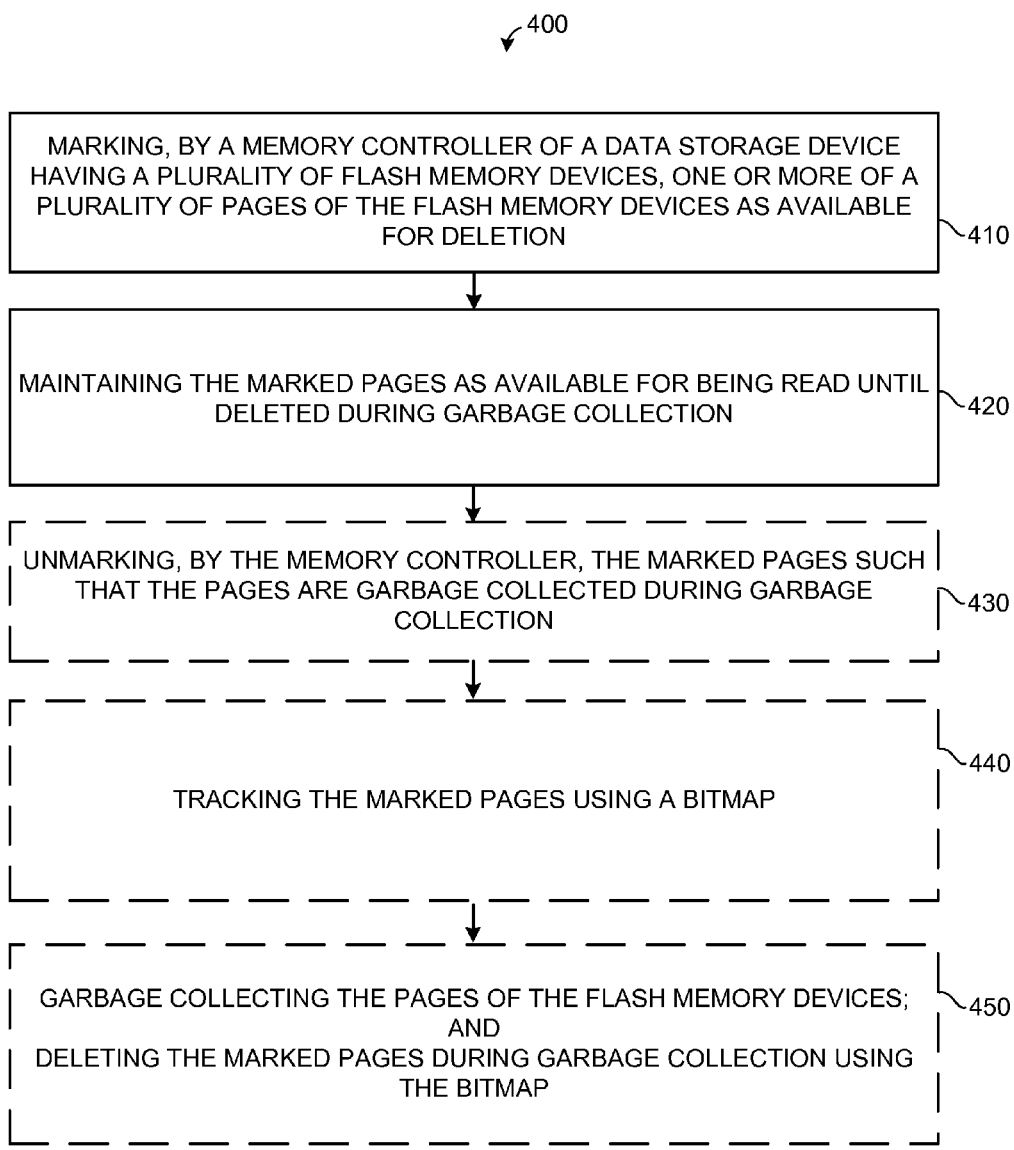
FIG. 4 is an exemplary flow diagram illustrating an exemplary process for managing data on a data storage device.

Referring to FIG. 4, an exemplary flowchart illustrates and exemplary process 400 using the systems and components described above with respect to FIGS. 1-3. Process 400 includes marking, by a memory controller of a data storage device having a plurality of flash memory devices, one or more of a plurality of pages of the flash memory devices as available for deletion (410). For example, as discussed above, the memory controller 230 may be configured to mark one or more of a plurality of pages of the flash memory devices 250 on the data storage device 220 as available for deletion. In one exemplary implementation, the memory controller 230 may mark the pages in response to receiving a command (e.g., cache trim command) from the host computing device 210, including from an application 211 on the host computing device 210.

Process 400 includes maintaining the marked pages as available for being read until deleted during garbage collection (420). For example, as discussed above, the memory controller 230 is configured to maintain the marked pages as available for being read until deleted during garbage collection. The data storage device 220 may determine when to perform garbage collection on the pages. In other implementations, the host device 210 may determine when to perform garbage collection on the pages.

Process 400 optionally may include unmarking, by the memory controller, the marked pages such that the pages are garbage collected during garbage collection (430). For example, as discussed above, the memory controller 230 may be configured to unmark the marked pages such that the pages are garbage collected during the garbage collection process. In one exemplary implementation, the memory controller 230 may mark the pages in response to receiving a command (e.g., a cache untrim command) from the host computing device 210, including from an application 211 on the host computing device 210.

Process 400 optionally may include tracking the marked pages using a bitmap (440). For example, as discussed above, the memory controller 230 may use the bitmap 237b to track the marked pages. Process 400 optionally may include garbage collecting the pages of the flash memory devices and deleting the marked pages during garbage collection using the bitmap (450). For example, as discussed above, the memory controller 230, using the garbage collection control engine 239, may garbage collect the pages of the flash memory devices 250 and delete the mark pages during the garbage collection process using the bitmap 237b.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations.

What is claimed is:

1. A data storage device, comprising:
   a plurality of flash memory devices, each of the flash memory devices being arranged into a plurality of blocks having a plurality of pages for storing data; and
   a memory controller operationally coupled with the flash memory devices, the memory controller being configured to:
      receive one or more commands from a host computing device that designate one or more specific pages of the pages of plurality of pages to mark for deletion during garbage collection;
      in response to the received commands, mark the one or more of the plurality of pages of the flash memory devices as available for deletion, wherein the marked pages are located at physical addresses;
      maintain the marked pages at the physical addresses as available for being read until deleted during garbage collection;
      unmark one or more of the marked pages;
      garbage collect the pages of the flash memory devices to include copying and re-writing unmarked pages to other pages; and
      delete the marked pages during the garbage collection.

2. The data storage device of claim 1 wherein the memory controller is further configured to mark one or more of the plurality of pages for immediate deletion.

3. The data storage device of claim 1 wherein the memory controller is further configured to use a bitmap to track the marked pages.

4. The data storage device of claim 3 wherein the memory controller is further configured to garbage collect the pages of the flash memory devices and to delete the marked pages during garbage collection using the bitmap.

5. The data storage device of claim 1 wherein at least some of the plurality of pages are used as a cache.

6. A method comprising:
    receiving, by a memory controller of a data storage device having a plurality of flash memory devices, one or more commands from a host computing device that designate one or more specific pages of a plurality of pages to mark for deletion during garbage collection;
    marking, by the memory controller, the one or more of a plurality of pages of the flash memory devices as available for deletion in response to the received commands, wherein the marked pages are located at physical addresses;
    maintaining the marked pages at the physical pages as available for being read until deleted during garbage collection;
    unmarking, by the memory controller, one or more of the marked pages;
    garbage collecting the pages of the flash memory devices to include copying and re-writing unmarked pages to other pages; and
    deleting the marked pages during the garbage collection.

7. The method of claim 6 further comprising marking, by the memory controller, one or more of the plurality of pages for immediate deletion.

8. The method of claim 6 further comprising tracking the marked pages using a bitmap.

9. The method of claim 8 further comprising:
    garbage collecting the pages of the flash memory devices; and
    deleting the marked pages during garbage collection using the bitmap.

10. A system comprising:
    a host device comprising one or more applications; and
    a data storage device operationally coupled with the host device, the data storage device comprising:
        a plurality of flash memory devices, each of the flash memory devices being arranged into a plurality of blocks having a plurality of pages for storing data; and
        a memory controller operationally coupled with the flash memory devices, the memory controller being configured to:
            receive one or more commands from the host computing device that designate one or more specific pages of the pages of plurality of pages to mark for deletion during garbage collection;
            in response to the received commands, mark the one or more of the plurality of pages of the flash memory devices as available for deletion, wherein the marked pages are located at physical addresses;
            maintain the marked pages at the physical addresses as available for being read until deleted during garbage collection;
            unmark one or more of the marked pages;
            garbage collect the pages of the flash memory devices to include copying and re-writing unmarked pages to other pages; and
            delete the marked pages during the garbage collection.

11. The system of claim 10 wherein the memory controller is further configured to mark one or more of the plurality of pages for immediate deletion.

12. The system of claim 10 wherein the memory controller is further configured to use a bitmap to track the marked pages.

13. The system of claim 12 wherein the memory controller is further configured to garbage collect the pages of the flash memory devices and to delete the marked pages during garbage collection using the bitmap.

14. The system of claim 10 wherein the host device is configured to communicate a command to the data storage device that indicates which of the plurality of pages to mark.

15. The system of claim 10 further comprising a second data storage device operationally coupled to the host device and to the data storage device, the second data storage device having a disc for storing data, wherein the data storage device comprising the plurality of flash memory devices is used as a cache for the data on the second data storage device.

* * * * *